United States Patent [19]

Graves, Jr.

[11] Patent Number: 5,234,498

[45] Date of Patent: Aug. 10, 1993

[54] PROCESS FOR FIXING LEAD-CONTAMINATED ECOLOGICALLY HAZARDOUS INDUSTRIAL WASTE MATERIALS USING CLINOPTILOLITE ZEOLITE

[75] Inventor: Paul R. Graves, Jr., Phenix City, Ala.

[73] Assignee: GNB Incorporated, Mendota Heights, Minn.

[21] Appl. No.: 941,392

[22] Filed: Sep. 8, 1992

Related U.S. Application Data

[63] Continuation-in-part of Ser. No. 761,163, Sep. 11, 1991, abandoned.

[51] Int. Cl.⁵ .............................................. C04B 18/14
[52] U.S. Cl. .................................... 106/733; 106/697; 588/252; 588/256
[58] Field of Search ................ 106/733, 697; 252/628; 588/252, 256

[56] References Cited

U.S. PATENT DOCUMENTS 4,116,705  9/1978  Chappell ............................. 106/697
4,537,710  8/1985  Komarneni et al. ................ 252/628

OTHER PUBLICATIONS

Dialog Abstract—"Studies on cement solidification of radioactive chemical slurry" Suzhen et al., China (Mar. 1986).

*Primary Examiner*—Mark L. Bell
*Assistant Examiner*—Paul Marcantoni
*Attorney, Agent, or Firm*—Leydig, Voit & Mayer, Ltd.

[57] ABSTRACT

There is provided a method for the ecologically safe disposal of lead-contaminated hazardous industrial wastes (such, as for example, those generated as discardable by-products in primary and secondary lead smelting operations, especially, blast furnace slags and matte), which comprises reducing the size of the lead-contaminated industrial wastes and treating them, prior to encapsulation in a hardenable material, with the naturally occurring zeolite, clinoptilolite, in an amount sufficient to prevent lead ions ($Pb^{+2}$) from leaching out of the industrial wastes, through exposure to the action of atmospheric agents (e.g., hot air and rain, or as a result of cyclical freezing and thawing in temperature climates), even over an extended period of time.

17 Claims, No Drawings

PROCESS FOR FIXING LEAD-CONTAMINATED ECOLOGICALLY HAZARDOUS INDUSTRIAL WASTE MATERIALS USING CLINOPTILOLITE ZEOLITE

RELATED APPLICATIONS

This application is a continuation-in-part of the co-pending U.S. patent application Ser. No. 07/761,163, now abandoned, which was filed on Sep. 11, 1991.

FIELD OF THE INVENTION

The present invention relates to a process for treating lead-contaminated hazardous wastes (such, as for example, those generated by primary and secondary lead smelting operations) so that such wastes may be disposed of in an ecologically safe manner without fear that toxic lead ions will leach out from the wastes and contaminate the environment. In particular, the present invention relates to a process for treating lead-contaminated lead-contaminated hazardous wastes (such as for example, primary and secondary lead smelter blast furnace slag and matte ("slag/matte")) to prevent the toxic lead ions ($Pb^{+2}$) contained in such wastes from leaching out of them by chemically immobilizing or "fixing" the lead ions, and then encasing the wastes (and the "fixed" lead ions) in a solid, rock-like material to facilitate the disposal thereof.

BACKGROUND OF THE INVENTION

Many industrial wastes, such as the discardable by-products formed in primary and secondary lead smelting operations and, in particular, the blast furnace slag and matte formed in such operations are contaminated with toxic lead ions ($Pb^{+2}$). These toxic lead ions are most often present in such wastes in a form in which they are susceptible, over time and through exposure to the forces of the elements (e.g. wind, rain, heat, etc.), to leaching out from and contaminate the leachate from the wastes. In turn, these leachates (containing the toxic ions) eventually find their way into rivers, streams, lakes and aquifers where, they may pose a potential serious health hazard to living beings.

Over the past decade or so, one of the most important ecological problems facing the industrialized countries, such as the United States, Japan and Western Europe is how to safely dispose of the ever-increasing amounts of industrial wastes that are contaminated with toxic lead ions ($Pb^{+2}$), such as the discardable by-products formed in primary and secondary lead smelting operations. Several approaches to solving this problem have been suggested and tried, with only limited success.

In general, these approaches have consisted of mixing the lead-contaminated industrial wastes with appropriate proportions of various hardenable materials such as, for example, Portland Cement alone or together with finely divided siliceous, or siliceous and aluminous material (which react chemically with slaked lime at ordinary temperatures in the presence of moisture to form a strong, slow-hardening cement), sodium silicate together with a setting agent, such as lime calcium chloride, Portland cement, calcium carbonate and mixtures of lime and a silicate or an aluminate and then curing the hardenable material. The lead-contaminated industrial wastes are thereby coated with the hardenable material and encapsulated by it after hardening. The toxic lead ions in the industrial waste are literally trapped in the encapsulating impenetrable hardened material and are, thereby, at least in theory, prevented from leaching out into the environment. Examples of such methods are shown and described over the years in U.S. Pat. Nos. 258,460 to Murphy; 1,816,988 to Potts; 2,044,204 to Brice et al.; 3,096,188 to Maydl; 3,188,221 to Matsuda et al.; 3,449,140 to Chi-Sun Yang; 3,565,648 to Mori et al.; 3,837,872 to Conner; 4,116,705 to Chappell; 4,124,405 to Quienot; 4,149,968 to Kupice et al.; 4,208,217 to Anderson; 4,209,335 to Katayama et al.; 4,306,912 to Forss; 4,318,744 to Dodson; 4,600,514 to Connor; 4,687,373 to Falk et al.; 4,731,120 to Tuutti and, in Japanese Patents 57-20158, 58-79892, 60-231445, 60-231446, 61-48444, 61-48448, 61-48455, 61-48456, 61-48460, 61-48467, 61-48468 and 61-48469.

While these various "encapsulating" methods have in a few special cases and circumstances provided a partial, temporary solution to the problems associated with the safe disposal of lead-contaminated industrial wastes they have not, in general, gained wide usage in the United States and elsewhere for disposal of lead-contaminated hazardous industrial wastes, such as those generated as discardable by-products in primary and secondary lead smelting operations, and, in particular, to the disposal of blast furnace slags and matte. This is because, while the toxic lead ions of the thus-treated hazardous wastes are encapsulated in the solid mass produced by such treatments (or "fixed") and are thereby, at least in theory, rendered "non-leachable", the lead in them in actuality is, as a result of the physical deterioration of the encapsulating hardened material (through long-term exposure to the action of atmospheric agents, e.g., hot air and rain, or as the result of cyclical freezing and thawing in the temperate climates), still partially removable therefrom by water leaching.

BRIEF SUMMARY OF THE INVENTION

The present invention provides a method for the ecologically safe disposal of lead-contaminated hazardous industrial wastes (such, as for example, those generated as discardable by-products in primary and secondary lead smelting operations, especially, blast furnace slags and matte), which comprises treating the lead-contaminated industrial waste, prior to encapsulation in a hardenable material, with the naturally occurring zeolite, clinoptilolite, in a solid form and in an amount sufficient to prevent lead ions ($Pb^{+2}$) from leaching out of such industrial wastes through exposure to the action of atmospheric agents (e.g., hot air and rain, or as a result of cyclical freezing and thawing in temperature climates), even over an extended period of time.

DETAILED DESCRIPTION OF THE INVENTION, AND EXAMPLES THEREOF

According to the present invention, the lead-contaminated hazardous industrial waste is first reduced in size (as, for example, by crushing) and then admixed with a solid mixture of an encapsulating, hardenable material (preferably Portland Cement) in a solid granular form and the naturally occurring zeolite, clinoptilolite, which is capable of undergoing ion exchange with the lead ions ($Pb^{+2}$) contaminating the industrial waste. Water is then added to this admixture until a homogeneous slurry of reduced-size industrial waste, hardenable material and zeolite, is formed. This slurry can either be transported wet to a disposal area (such as a landfill) or cast into molds, allowed to harden and thereafter disposed of.

The naturally occurring clinoptilolite zeolite tightly binds the toxic lead ions ($Pb^{+2}$) in the encapsulated reduced-size industrial waste, and thereby prevents them from leaching out of the hardened slurry, probably through ion exchange. The ion exchange properties of clinoptilolite zeolite result from a three-dimensional ("3-D") aluminosilica framework in the clinoptilolite crystals. This 3-D framework sets up cation channels which are occupied by sodium, potassium, or other similar cations. The large lead ions in the industrial waste (which are cations) have low hydration energies and readily displace the much smaller sodium, potassium or other similar relatively small, mobile cations in the 3-D framework of the clinoptilolite crystals, where they become tightly bound. Once these large lead ions are so bound they are very difficult to remove from the 3-D clinoptilolite crystalline framework and they are thereby prevented from leaching from the hardened slurry, even when present in trace amounts in the original industrial waste. While it is preferred to use the naturally occurring zeolite, clinoptilolite (which is found, in relative abundance, in the western United States) in practicing the invention, it should be appreciated that any material which can tightly bind the lead ions contaminating the industrial waste (probably through ion exchange) to prevent such ions from leaching out of the industrial waste could also be employed.

The clinoptilolite used to treat the reduced-size industrial waste according to the process of the present invention should be used in an amount effective to insure that nearly all of the contaminating lead ions in the industrial waste are bound to the clinoptilolite crystals (probably through ion exchange with the $Na^+$, $K^+$ and exchangeable cations present in those crystals) and thereby are prevented from leaching out of the industrial waste. Care should be taken, however, to prevent too much clinoptilolite in relation to the amount of reduced-size industrial waste and encapsulating, hardenable material from being used, because if too much clinoptilolite is used, the resulting hardened slurry will be too brittle and easily break apart.

I have found that in treating the lead-contaminated industrial waste generated as discardable by-products in both primary and secondary lead smelting operations (such as slags and matte) according to the method of my invention, when clinoptilolite in an amount of at least about 10 and preferably, of at least about 15% by weight based on the total weight of the reduced-solid slag/matte, zeolite and Portland Cement admixture (when used with an equal amount by weight of a hardenable encapsulating material, such as Portland Cement, Type I) is admixed with the reduced-solid slag/matte that this amount effectively lowers the leachable lead in the leachate from the slag/matte (as determined by the Method 1311 Toxicity Characteristic Leaching Procedure test described in 40 C.F.R. § 261, Appendix II—the "TCLP" test) to well below that amount of leachable lead which is presently permissible in solid wastes by the Environmental Protection Agency Toxic Characteristic list (EPA/530-SW-89-045, March, 1990). The amount being 5 parts per million ("ppm") or below (as determined by the TCLP test).

The size to which the industrial waste is reduced in size (as, for example, by crushing) before being treated with the clinoptilolite is not thought to be critical. However, in general, the reduced-size should not be so small as to be powder-like and, therefore, not only difficult to handle, but also possibly hazardous to workers carrying out the process of the present invention. On the other hand, the reduced-size should not be so large and bulky that the reduced-size industrial waste is not adequately coated with the mixture of clinoptilolite and the encapsulating, hardenable material. In general, in treating the lead-contaminated industrial waste generated as discardable by-products in both primary and secondary lead smelting operations (such as slags and matte) according to the method of my invention, it has been found that for ease of handling and to insure adequate encapsulation by the hardenable material it is preferable to reduce the slag/matte (by grinding, for example) to a diameter of about one-quarter (0.25) inches or less.

The specific type of hardenable, encapsulating material used is also not believed to be critical to the practice of the invention, and virtually any of the various hardenable materials heretofore used in the art as encapsulating agents (as described above in the BACKGROUND OF THE INVENTION portion of this Specification) may be employed. Because of its hard, rock-like properties after curing and its relative durability, it is preferable to use Portland Cement, Type I as the hardenable, encapsulating material. Again, the amount of hardenable, encapsulating material used is not critical to the practice of the invention so long as enough is used to encapsulate, after hardening, all of the reduced-size industrial waste and clinoptilolite admixture with a relatively durable, long lasting coat of hardened material. In general, in treating the lead-contaminated industrial waste generated as discardable by-products in both primary and secondary lead smelting operations (such as slag and matte) according to the method of my invention, it preferred to use at least about 10% by weight of the hardenable, encapsulating material based on the total weight of the reduced-size slag/matte, zeolite and Portland Cement admixture.

The amount of water used to make the homogeneous slurry of the admixture of reduced-size industrial waste, clinoptilolite and hardenable, encapsulating material should be sufficient to completely slurry the admixture so that it can be poured and also to allow for it to cure (i.e. to become relatively durable and rock-like) in a reasonable time frame, i.e., in about twenty-four (24) to seventy-two hours (72) (depending on the weather conditions). In general, in treating the lead-contaminated industrial waste generated as discardable by-products in both primary and secondary lead smelting operations (such as slags and matte) according to the method of my invention, it is preferred to use water in an amount of at least about 10 to 15% by weight, based on the total weight of the reduced-size slag/matte, zeolite and Portland Cement admixture.

It is believed that, using the foregoing description, one skilled in the art can utilize the present invention to its fullest extent. The following Examples are, therefore, to be construed as merely illustrative of and are not to be construed in any way as limiting the remainder of the disclosure whatsoever.

EXAMPLE 1

Seventeen samples of slaq/matte (which are lead-contaminated industrial waste material generated as discardable by-products in both primary and secondary lead smelting operations) were taken from a secondary lead smelter at various dates under controlled conditions. These samples were taken so as to be representative of the true slag/matte ratio of an individual lead smelter slag tap. The samples were then reduced in size by grinding in a bench grinder to a diameter of about 0.25 inches or less, mixed, and split in half using a riffle. Half of the split was tested for leachable lead using the Method 1311 Toxicity Characteristic Leaching Procedure ("TCLP") test, described in 40 C.F.R. §261, Appendix II ("TCLP"). Results ranged from 3.80 parts per million ("ppm") to 364 ppm of leachable lead, with the mean being 191.16 ppm of leachable lead.

From the other half of the "split", a 700 gram sample of crushed slag/matte was taken and mixed with 150 grams of naturally occurring clinoptilolite zeolite, 150 grams of Portland Cement Type I, and 150 milliliters ("ml") of tap water until a homogeneous slurry was formed. This slurry was then poured into a 500 ml plastic beaker and allowed to cure for about twenty-four (24) hours. It was then removed from the beaker and allowed to cure for twenty-four (24) more hours.

The cured sample was next broken up to pass through a three-eighths (⅜) inch sieve and then tested for leachable lead using the TCLP test. Results of these tests ranged from 0.07 ppm to 0.49 ppm of leachable lead, with a mean of 0.32 ppm of leachable lead.

EXAMPLE 2

Large chunks of slag and matte (which are lead-contaminated industrial waste material generated as discardable by-products in both primary and secondary lead smelting operations) were taken from a smelter slag pile. The size of the chunks ranged from about ten (10) to about nineteen (19) inches in diameter. This slag and matte was reduced in size by crushing in a Kinetic Crusher and screened to a diameter of about one-quarter (¼) of an inch or less. A grab sample was then taken and two separate TCLP tests were run on the grab sample to determine the leachable lead in it. The results of these two such tests indicated that the leachable lead in the slag/matte was 199 ppm and 215 ppm.

From the remainder of the crushed slag/matte sample 280 pounds was set aside for a large scale test of the process of the present invention. Two separate batches of slag/matte were treated according to the process of the present invention. In each batch, 140 pounds of crushed slag/matte, 30 pounds of clinoptilolite zeolite, 30 pounds of Portland Cement Type I, and 2.5 gallons of tap water was used. The two batches were separately mixed to form a homogeneous aqueous slurry and cast into a wooden mold, which was one foot by one foot by one foot in size. After twenty-four (24) hours, the wooden molds were removed and the partially hardened slurry was allowed to cure for forty-eight (48) more hours. After that time, a large piece was broken off of one of the hardened blocks and ground to pass through a three-eighths (⅜) inch sieve and tested for leachable lead by the TCLP test. The result of this test was 0.31 ppm leachable lead.

EXAMPLE 3

Samples of slag/matte were taken from a secondary lead smelter slag/matte pile and reduced in size in a Kinetic Crusher to a diameter of one-quarter (0.25) inch or less. A grab sample was taken, thoroughly mixed and split using a riffle. Half the split was subjected to the TCLP test. The results were 752 ppm leachable lead. The other half of the split (750 grams) was treated according to the invention with 150 grams of Portland Cement Type I, 150 grams of clinoptilolite zeolite and 150 grams of water to form a homogeneous slurry, which was allowed to cure for 36 hours. The cured sample was then tested for leachable lead by the TCLP test and 0.99 ppm leachable lead was found.

The following two examples are believed to illustrate that it is the ion exchange between the contaminating lead ions ($Pb^{+2}$) in lead-contaminated industrial wastes and the exchangeable cations (such as $Na^+$, $K^+$ and the like) in the clinoptilolite zeolite used in the examples which make the lead in the industrial waste, after treatment according to the present invention, "non-leachable" and not merely the physical encapsulation of them by the Portland Cement Type I, which was used as the encapsulating material in the examples.

EXAMPLE 4

700 grams of the ground slag/matte sample from Example 1 (determined to contain 364 ppm leachable lead by the TCLP test) was mixed with 150 grams of Portland Cement Type I and 150 grams of clinoptilolite zeolite. One hundred-fifty grams of water was added to this mixture and the resulting mixture was tested immediately (i.e. before it could harden to any appreciable extent) using the TCLP test. Results on the "un-cured" sample were 0.69 ppm leachable lead. This small amount of leachable lead in the "un-used" slurry indicates that it is the ion exchange between the lead ions in the slag/matte and the exchangeable cations (such as $Na^+$, $K^+$ and the like) in the clinoptilolite zeolite which makes the lead ions in the slag/matte "non-leachable", and not the physical "encapsulation" of them by the hardened Portland Cement.

EXAMPLE 5

A 700 grams sample of slag/matte which was reduced in size to a greater than three-eighth (⅜) inches in diameter was admixed with 150 grams of clinoptilolite zeolite, 150 grams of Portland Cement Type I and 150 grams of water to form a homogeneous slurry. After curing, the hardened admixture was ground so that it passed through a one-quarter (0.25) inch sieve and tested for leachable lead by the TCLP test. 0.53 ppm leachable lead was found. The small amount of leachable lead in the crushed hardened admixture indicates that it is the ion exchange between the lead ions in the slag/matte and the exchangeable cations (such as $Na^+$, $K^+$ and the like) in the clinoptilolite zeolite which makes the lead ions in the slag/matte "non-leachable", and not the physical "encapsulation" of them by the hardened Portland Cement Type I, since the size of the hardened admixture tested for leachable lead was smaller than the size of the ground slag/matte used in making the hardened sample (¼ inches or less in diameter for the hardened admixture versus ⅜ inches or larger in diameter for the original crushed slag/matte).

I claim as my invention:

1. A process for treating lead-contaminated, solid industrial wastes to make said wastes ecologically safe for disposal which comprises, (a) reducing the size of the lead-contaminated, solid industrial waste, (b) admixing said solid industrial waste with a mixture comprising at least about 10% by weight of an encapsulating, hardenable material in solid, granular form and at least about 10% by weight of a zeolite capable of binding the lead ions in the lead-contaminated, solid industrial waste to lower the leachable lead in the admixture after slurrying with water to below about 5 ppm, (c) adding water to the admixture in an amount sufficient to form, with agitation, a homogeneous slurry of said industrial waste, zeolite and encapsulating, hardenable material, and (d) allowing the slurry to harden.

2. The process of claim 1 wherein the zeolite capable of binding the lead ions in the industrial waste is clinoptilolite.

3. The process of claim 2 wherein the encapsulating, hardenable material is Portland Cement.

4. The process of claim 1 wherein the lead-contaminated industrial waste is reduced in size by crushing.

5. The process of claim 3 wherein the Portland Cement and clinoptilolite are used in about equal amounts by weight.

6. A process for treating the toxic, lead-contaminated, solid discardable by-products generated in primary and secondary lead smelting operations to make said lead-contaminated, solid discardable by-products ecologically safe for disposal which comprises, (a) reducing the size of the lead-contaminated, solid discardable by-products, (b) admixing said lead-contaminated, solid discardable by-products with a mixture comprising at least about 10% by weight of an encapsulating, hardenable material and at least about 10% by weight of a zeolite capable of binding the lead ions in the lead-contaminated, solid discardable by-products, to lower the leachable lead in the admixture after slurrying with water to below about 5 ppm, (C) adding water to the admixture in an amount sufficient to form, with agitation, a homogeneous slurry of lead-contaminated, solid discardable by-products, zeolite and encapsulating, hardenable material, and (d) allowing slurry to harden.

7. The process of claim 6 wherein the zeolite capable of binding the lead ions in the lead-contaminated, solid discardable by-products is clinoptilolite.

8. The process of claim 7 wherein the encapsulating, hardenable material is Portland Cement.

9. The process of claim 6 wherein the lead-contaminated, solid discardable by-product generated in primary and secondary lead smelting operations is reduced in size by crushing.

10. The process of claim 8 wherein the Portland Cement and clinoptilolite are used in about equal amounts by weight.

11. A hardened slurry comprising an admixture of lead-contaminated, solid industrial waste, at least about 10% by weight of an encapsulating hardenable material and at least about 10% by weight of a zeolite capable of binding the lead ions in the solid industrial waste to lower the leachable lead in the hardened slurry to below about 5 ppm.

12. The hardened slurry of claim 11 wherein the zeolite capable of binding the lead ions in the solid industrial waste is clinoptilolite.

13. The hardened slurry of claim 12 wherein the encapsulating, hardenable material is Portland Cement.

14. A hardened slurry comprising an admixture of lead-contaminated, solid discardable by-products generated by primary or secondary lead smelting operations, at least about 10% by weight of an encapsulating hardenable material and at least about 10% by weight of a zeolite capable of binding the lead ions in said lead-contaminated, solid discardable by-products to lower the leachable lead in the hardened slurry to below about 5 ppm.

15. The hardened slurry of claim 14 wherein the zeolite capable of binding the lead ions in the lead-contaminated, solid discardable by-products is clinoptilolite.

16. The hardened slurry of claim 15 wherein the encapsulating, hardenable material is Portland Cement.

17. The hardened slurry of claim 16 wherein the Portland Cement and clinoptilolite are used in about equal amounts by weight.

* * * * *